United States Patent
Dittel et al.

(10) Patent No.: US 10,181,617 B2
(45) Date of Patent: Jan. 15, 2019

(54) PATTERNED CRIMP FOR BATTERY COLLECTOR ATTACHMENT

(71) Applicant: Johnson Controls Technology Company, Plymouth, MI (US)

(72) Inventors: Dennis L. Dittel, Holland, MI (US); Matthew R. Tyler, New York, NY (US)

(73) Assignee: Johnson Controls Technology Company, Auburn Hills, MI (US)

( * ) Notice: Subject to any disclaimer, the term of this patent is extended or adjusted under 35 U.S.C. 154(b) by 224 days.

(21) Appl. No.: 15/176,954

(22) Filed: Jun. 8, 2016

(65) Prior Publication Data
US 2017/0170509 A1    Jun. 15, 2017

Related U.S. Application Data

(60) Provisional application No. 62/267,206, filed on Dec. 14, 2015.

(51) Int. Cl.
| | | |
|---|---|---|
| *H01M 4/00* | (2006.01) | |
| *H01M 10/04* | (2006.01) | |
| *H01M 10/0525* | (2010.01) | |
| *H01M 2/26* | (2006.01) | |

(52) U.S. Cl.
CPC ......... *H01M 10/0431* (2013.01); *H01M 2/26* (2013.01); *H01M 10/0468* (2013.01); *H01M 10/0525* (2013.01)

(58) Field of Classification Search
CPC ......... H01M 10/0431; H01M 10/0468; H01M 10/0525; H01M 2/26
See application file for complete search history.

(56) References Cited

U.S. PATENT DOCUMENTS

| | | | |
|---|---|---|---|
| 4,421,609 A | 12/1983 | Gerard et al. | |
| 6,106,973 A | 8/2000 | Sonozaki et al. | |
| 6,379,840 B2 | 4/2002 | Kitoh et al. | |
| 6,440,604 B1 | 8/2002 | Inoue et al. | |
| 6,842,330 B2 | 1/2005 | Farahmandi et al. | |
| 7,493,791 B2 | 2/2009 | Chadbourne | |
| 8,232,002 B2 | 7/2012 | Yamauchi et al. | |
| 8,241,786 B2 | 8/2012 | Taniguchi et al. | |
| 8,329,338 B2 * | 12/2012 | Tasai | H01M 2/266 429/158 |
| 2004/0126650 A1 | 7/2004 | Kim | |
| 2008/0206640 A1 | 8/2008 | Shibata et al. | |
| 2009/0297949 A1 | 12/2009 | Berkowitz et al. | |

(Continued)

FOREIGN PATENT DOCUMENTS

FR    1028539    5/1953

OTHER PUBLICATIONS

PCT/US2016/045248 International Search Report and Written Opinion dated Nov. 22, 2016.

*Primary Examiner* — Jane J Rhee
(74) *Attorney, Agent, or Firm* — Fletcher Yoder, P.C.

(57) ABSTRACT

A battery module includes an electrochemical cell. The electrochemical cell includes a jelly roll having an anode sheet, a cathode sheet, and a separator rolled together to form the jelly roll. Further, the electrochemical cell includes a current collector. The current collector includes a patterned crimp impression therein that extends into and fixes the current collector to an end of the jelly roll.

22 Claims, 11 Drawing Sheets

(56) References Cited

U.S. PATENT DOCUMENTS

| | | | |
|---|---|---|---|
| 2012/0189889 A1* | 7/2012 | Kim | H01M 2/06 |
| | | | 429/94 |
| 2013/0017340 A1* | 1/2013 | Brown | H01M 4/0404 |
| | | | 427/458 |
| 2014/0059847 A1 | 3/2014 | Nakamura et al. | |
| 2015/0002989 A1 | 1/2015 | Vigneras | |

* cited by examiner

PATTERNED CRIMP FOR BATTERY COLLECTOR ATTACHMENT

CROSS REFERENCE TO RELATED APPLICATIONS

This application claims priority from and the benefit of U.S. Provisional Application Ser. No. 62/267,206, entitled "PATTERNED CRIMP FOR BATTERY COLLECTOR ATTACHMENT", filed Dec. 14, 2015, which is hereby incorporated by reference for all purposes.

BACKGROUND

The present disclosure relates generally to the field of batteries and battery modules. More specifically, the present disclosure relates to a system and method for patterned crimping of current collectors on a jelly roll of an electrochemical cell.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, electrochemical cells may include one or more collectors fixed to an electrochemical cell jelly roll (e.g., cell element) having anode material, cathode material, and a separator. Unfortunately, the techniques for fixing the collectors to the jelly roll may be cumbersome and expensive. Accordingly, improved techniques for fixing the current collectors to the jelly roll are desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates a battery module that includes an electrochemical cell. The electrochemical cell includes a jelly roll having an anode sheet, a cathode sheet, and a separator rolled together to form the jelly roll. Further, the electrochemical cell includes a current collector. The current collector includes a patterned crimp impression therein that extends into and fixes the current collector to an end of the jelly roll.

The present disclosure also relates to an electrochemical cell having anode material, cathode material, and a separator rolled together to form a jelly roll. Further, the electrochemical cell includes a current collector fixed to an end of the jelly roll via a patterned crimp impression on the current collector, where the current collector is not welded to the jelly roll.

The present disclosure also relates to a system including an electrochemical cell having a jelly roll and a current collector coupled to an end of the jelly roll. The system also includes a crimp press having a first die that includes a first pattern, and a second die that includes a second pattern. The first die and the second die are configured to press into first and second opposing legs, respectively, of the current collector to impress the first pattern and the second pattern onto the first and second opposing legs, respectively, to crimp the current collector onto the end of the jelly roll.

DRAWINGS

Various aspects of this disclosure may be better understood upon reading the following detailed description and upon reference to the drawings in which.

DETAILED DESCRIPTION

Figure 1:
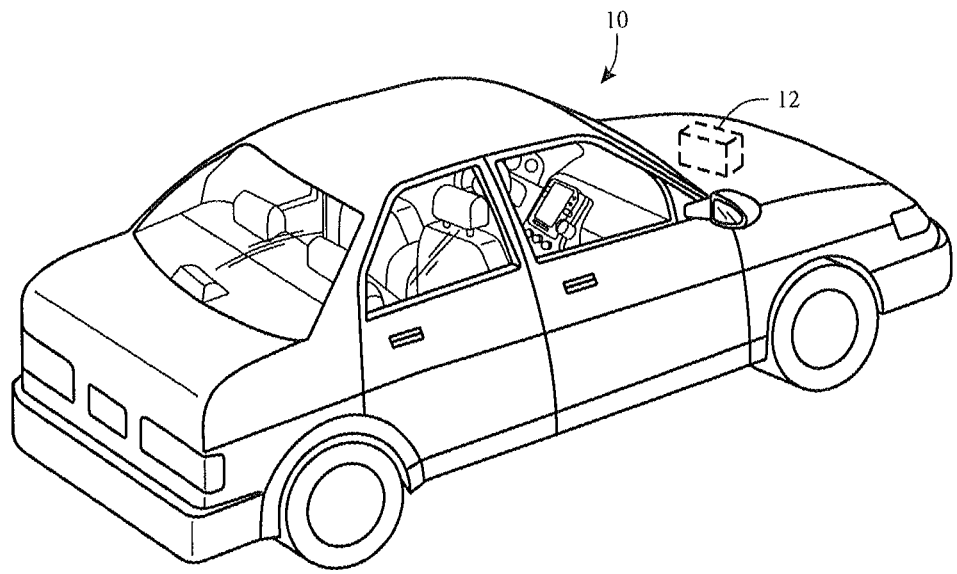
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, an electrochemical cell may include a cell element having anode material (e.g., positive electrode sheet), cathode material (e.g., negative electrode sheet), and a separator disposed between the anode material and the cathode material. The anode material, cathode material, and separator (e.g., the cell element) may be rolled (e.g., wound) into a jelly roll (e.g., spiral) forming a cylindrical or prismatic shape. Either end (e.g., open end) of the jelly roll may be welded together to at least temporarily maintain the jelly roll shape, and to provide a surface to which a current collector may be coupled.

A positive current collector may be affixed to one end of the jelly roll, and a negative current collector may be affixed to the opposing end of the jelly roll. For example, the positive current collector may be crimped to a first end of the jelly roll and may include a positive terminal extending therefrom, and the negative current collector may be crimped to a second end of the jelly roll opposite to the first end and may include a negative terminal extending therefrom. As described above, the ends of the jelly roll may first be welded (e.g., such that the sheets forming the jelly roll are welded together), and then the current collectors may be affixed to the welded ends of the jelly roll.

In accordance with present embodiments, the current collectors may be crimped to the ends of the jelly roll by way of patterned crimping dies. For example, in traditional configurations, the current collector may form a U or V shape that is disposed around the end of the jelly roll, and two flat dies may press into (e.g., sandwich) either leg of the U or V shape, with the end of the jelly roll disposed therebetween, such that the current collector is crimped onto the end of the jelly roll. However, it is now recognized that, because the two dies (e.g., as opposed to patterned dies) used in the traditional configuration are flat, the current collector may not be sufficiently secured to the jelly roll. In traditional configurations, the current collector may be welded to the end of the jelly roll after the crimping process, to enhance security of the current collector thereto. Unfortunately, the additional welding process is costly and increases a manufacturing time.

In accordance with present embodiments, the current collector is crimped onto the end of the jelly roll via patterned crimping dies. The patterned crimping dies may include, for example, ridges or conical extensions or other patterns that press into the current collector as legs of the current collector sandwich the end of the jelly roll therebetween. The impression of the patterned crimping dies onto the current collector (and onto the end of the jelly roll to which the current collector is attached) causes the current collector to be more securely fixed to the end of the jelly roll. In some embodiments, the patterned crimping process may obviate the need to weld the current collector to the end of the jelly roll. Accordingly, manufacturing cost and time may be reduced.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
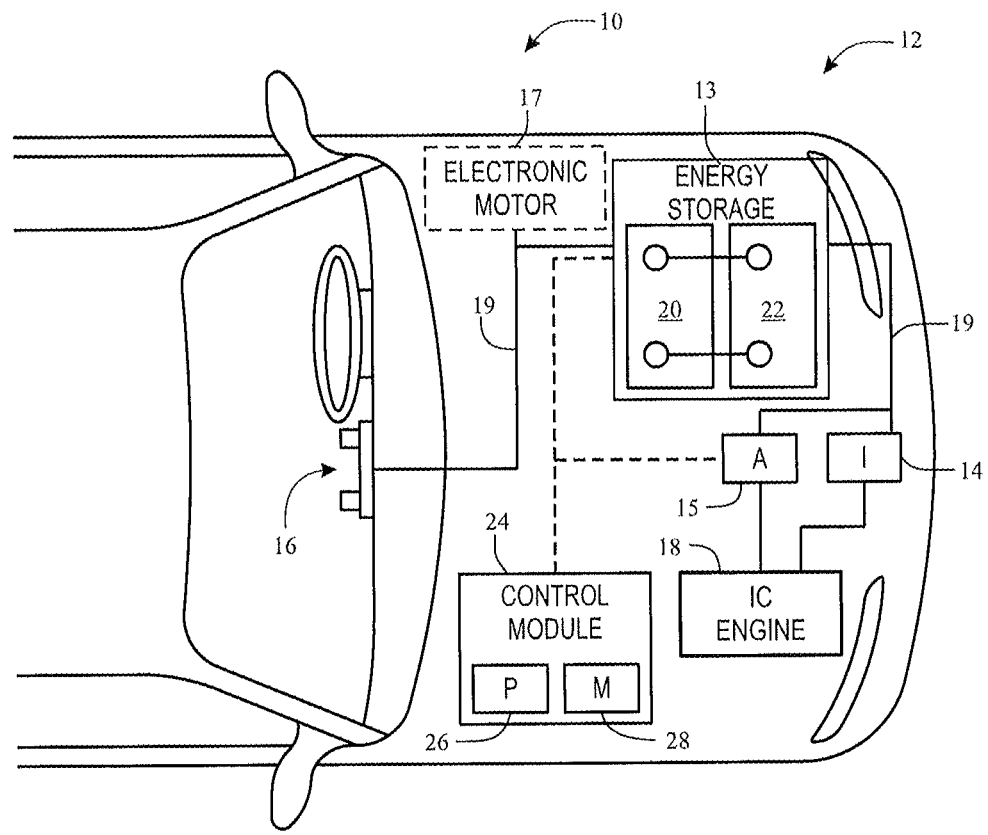
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

In accordance with an aspect of the present disclosure, electrochemical cells of the battery module 20 may include a jelly roll having anode material (e.g., a positive electrode sheet), cathode material (e.g., a negative electrode sheet), and a separator (e.g., a separator sheet) disposed therebetween. The anode material, cathode material, and the separator may be rolled into a jelly roll forming a cylindrical or generally prismatic shape. Current collectors may be crimped onto either end (e.g., either open end) of the jelly roll. The current collectors may be crimped onto either end of the jelly roll via patterned crimping dies that securely fix the current collectors to the ends of the jelly roll. In some embodiments, the patterned crimping process may sufficiently secure the current collectors to the ends of the jelly roll such that welding of the current collectors to the jelly roll is not needed.

Figure 3:
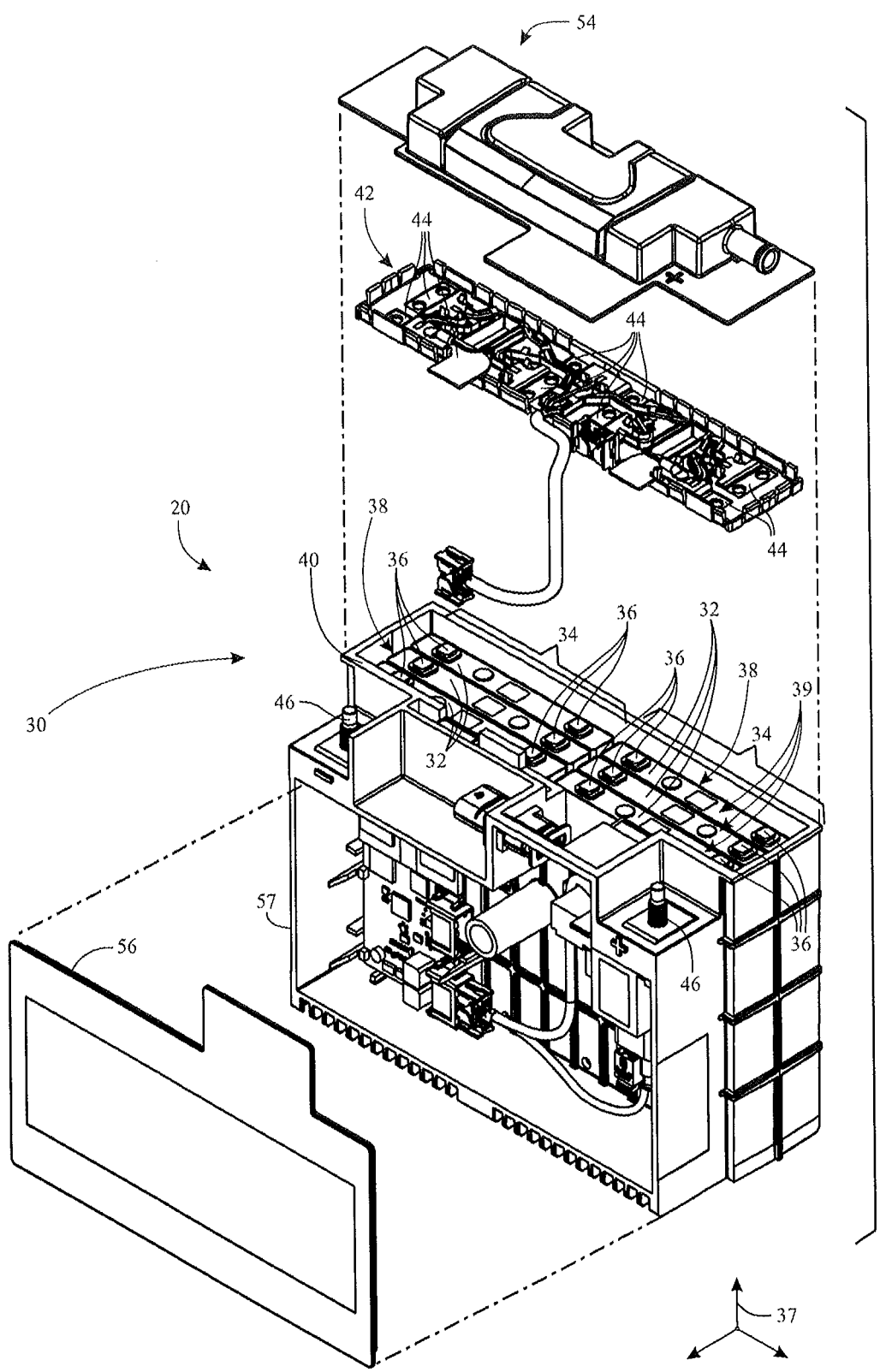
FIG. 3 is an exploded perspective view of an embodiment of a battery module for use in the battery system of FIG. 1, in accordance with an aspect of the present disclosure.

An overhead exploded front perspective view of an embodiment of the battery module 20 for use in the vehicle 10 of FIG. 2 is shown in FIG. 3. In the illustrated embodiment, the battery module 20 (e.g., lithium-ion [Li-ion] battery module) includes a housing 30 and electrochemical cells 32 (e.g., prismatic lithium-ion [Li-ion] electrochemical cells) disposed inside the housing 30, each including a jelly roll and current collectors crimped thereon in accordance with present embodiments. In the illustrated embodiment, six prismatic Li-ion electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 (e.g., cell terminals, minor terminals) extending upwardly (e.g., in direction 37) from terminal ends 39 of the electrochemical cells. Accordingly, the terminals 36 may extend into an opening 38 disposed in an upper side 40 or face of the housing 30. For example, the electrochemical cells 32 may be inserted into the housing 30 through the opening 38 in the upper side 40, and positioned within the housing 30 such that the terminals 36 of the electrochemical cells 32 are disposed in the opening 38. A bus bar carrier 42 may be disposed into the opening 38 and may retain bus bars 44 disposed thereon and configured to interface with the terminals 36 of the electrochemical cells 32. For example, the bus bars 44 may interface with the terminals 36 to electrically couple adjacent electrochemical cells 32 together (e.g., to form a group of electrically interconnected electrochemical cells 32). The bus bars 44 may be mounted or disposed on or proximate to a top or a bottom face or surface of the bus bar carrier 42 (e.g., facing away from the electrochemical cells 32 or facing the electrochemical cells 32). However, in other embodiments, the battery module 20 may not include the bus bar carrier 42 and the bus bars 44 may be disposed directly onto the terminals 36.

Depending on the embodiment, the bus bars 44 may couple the electrochemical cells 32 in series, in parallel, or some of the electrochemical cells 32 in series and some of the electrochemical cells 32 in parallel. In general, the bus bars 44 enable a group of electrically interconnected electrochemical cells 32. Further, certain of the bus bars 44 may be configured to enable electrical coupling of the group of electrically interconnected electrochemical cells 32 with major terminals 46 (e.g., module terminals) of the battery module 20, where the major terminals 46 are configured to be coupled to a load (e.g., component(s) of the vehicle 10) to power the load. A cover 54 (which may be a part of the housing 30 or may be a separate component) may be disposed over the bus bar carrier 42 to seal the opening 38 in the housing 30 of the battery module 20 and/or to protect the bus bars 44, other components disposed on the bus bar carrier 42, and/or other components of the battery module 20. Further, a panel 56 may be disposed over an adjacent side 57 of the housing 30 to protect other components (e.g., electrical components) fixed to the adjacent side 57 of the housing 30.

As previously described, the electrochemical cells 32 of the battery module 20 may include a jelly roll having anode material (e.g., a positive electrode sheet), cathode material (e.g., a negative electrode sheet), and a separator disposed therebetween. The anode material, cathode material, and the separator may be rolled into a jelly roll forming a cylindrical or generally prismatic shape. Current collectors may be crimped onto either end (e.g., either open spiral end) of the jelly roll. The current collectors may be crimped onto either end of the jelly roll via patterned crimping dies that securely fix the current collectors to the ends of the jelly roll. In some embodiments, the patterned crimping process may sufficiently secure the current collectors to the ends of the jelly roll such that welding of the current collectors to the jelly roll is no needed. These and other features will be described in detail below.

Figure 4:
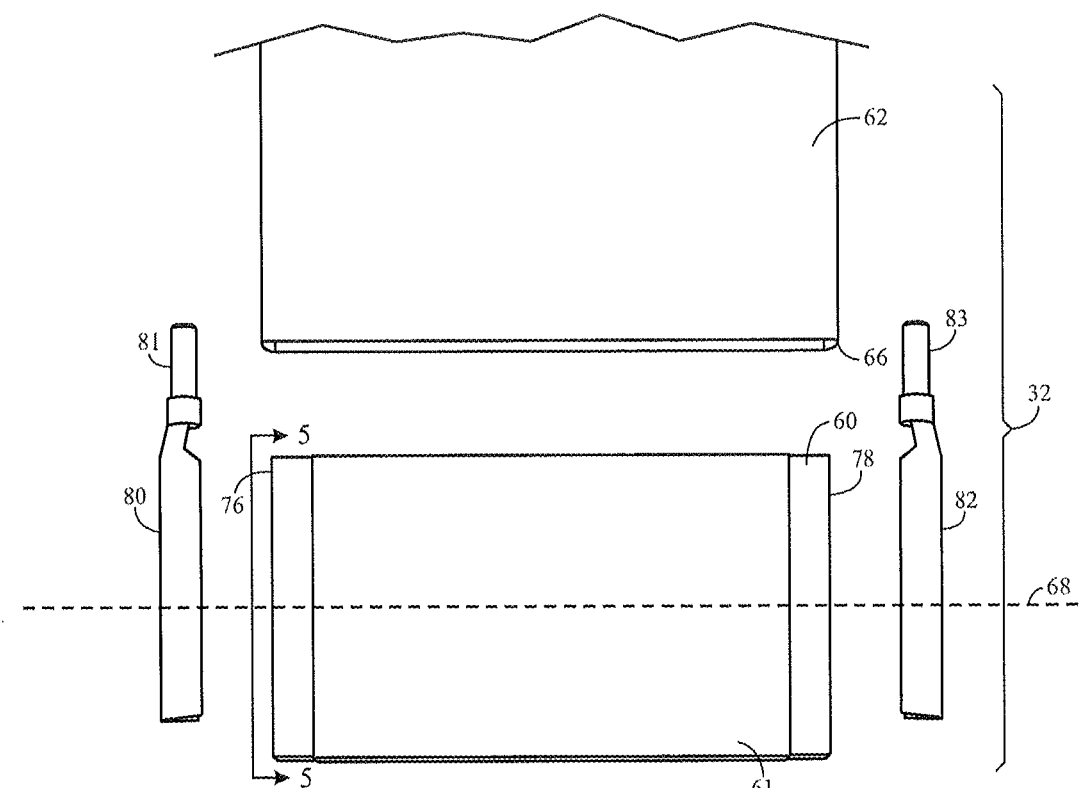
FIG. 4 is an exploded front schematic view of an embodiment of an electrochemical cell for use in the battery module of FIG. 3, in accordance with an aspect of the present disclosure
Figure 5:
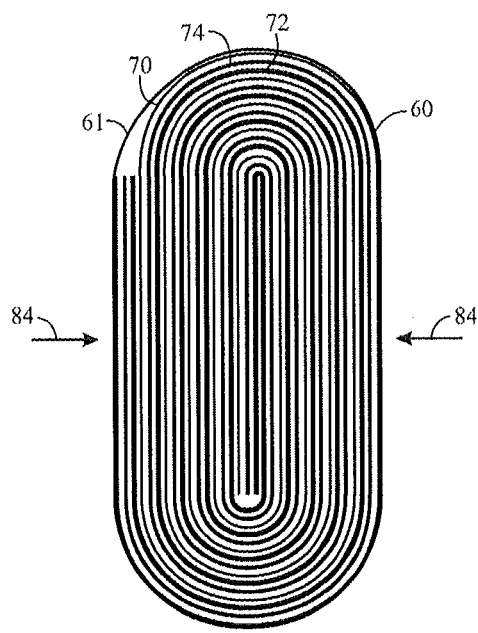
FIG. 5 is a side schematic view of an embodiment of a jelly roll of the electrochemical cell of FIG. 4, in accordance with an aspect of the present disclosure.

FIG. 4 is a schematic front view of an embodiment of one of the electrochemical cells 32 illustrated in FIG. 3. FIG. 5 is a schematic side view of an embodiment of a jelly roll 60 of the electrochemical cell 32 of FIG. 3. As shown in FIG. 4, the electrochemical cell 32 includes the jelly roll 60 (e.g., within a wrapper 61 disposed around the jelly roll 60) configured to be disposed in a casing 62 (e.g., through an opening 64 in a bottom 66 of the casing 62). As shown in FIG. 5, the jelly roll 60 may include, as previously described, a winding of anode material 70 (e.g., a positive electrode sheet), cathode material 72 (e.g., a negative electrode sheet), and a separator 74, where the separator 74 is disposed between the anode material 70 and the cathode material 72. The jelly roll 60 may be submerged in, or soaked with, electrolyte. For example, the casing 62 illustrated in FIG. 4 may receive the electrolyte while the jelly roll 60 is disposed in the casing 62.

Focusing on the electrochemical cell 32 shown in FIG. 4, the illustrated jelly roll 60 includes a first end 76 (e.g., first open end) and a second end 78 (e.g., second open end) opposite to the first end 76. A first current collector 80 (e.g., positive current collector) having a first terminal 81 (e.g., positive terminal) is configured to be coupled to the first end 76 (e.g., via a patterned crimping process), and a second current collector 82 (e.g., negative current collector) having a second terminal 83 (e.g., negative terminal) is configured to be coupled to the second end 78 (e.g., via a patterned crimping process). The first terminal 81 may be integrally formed with the first current collector 80, welded to the first current collector 80, adhesively coupled to the first current collector 80, or otherwise attached or affixed to the first current collector 80. Likewise, the second terminal 83 may be integrally formed with the second current collector 82, welded to the second current collector 82, adhesively coupled to the second current collector 82, or otherwise attached or affixed to the second current collector 82.

In accordance with present embodiments, the first current collector 80 is configured to be coupled with the first end 76 of the jelly roll 60 via a patterned crimp. Further, the second current collector 82 is configured to be coupled with the second end 78 of the jelly roll 60 via a patterned crimp. The patterned crimp enables a secure connection between the current collectors 80, 82 and the ends 76, 78 of the jelly roll 60 (e.g., without having to weld the current collectors 80, 82 to the ends 76, 78), as described in detail below with reference to later figures. In some embodiments, each end 76, 78 of the jelly roll 60 may be pinched together or secured (e.g., via welding, such as ultrasonic welding) prior to coupling of the corresponding current collector 80, 82 thereto, as described in detail below with reference to later figures. For example, arrows 84 in FIG. 5 illustrate a direction in which the end 76 of the jelly roll 60 may be pinched prior to (and/or during) coupling of the current collector 80 (e.g., of FIG. 4) thereto.

Figure 6:
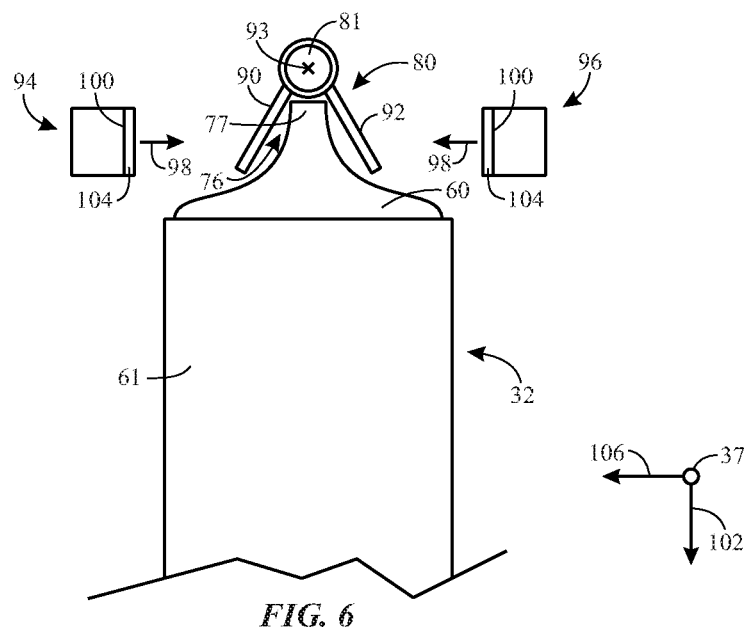
FIG. 6 is a top schematic view of an embodiment of a cell element of the electrochemical cell of FIG. 3 during a patterned crimping process, in accordance with an aspect of the present disclosure.
Figure 7:
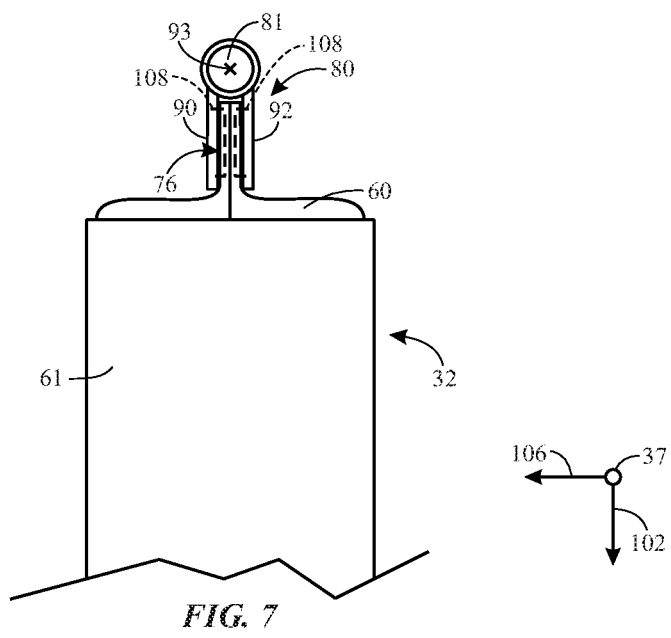
FIG. 7 is a top schematic view of an embodiment of a cell element of the electrochemical cell of FIG. 3 after a patterned crimping process, in accordance with an aspect of the present disclosure.

Turning now to FIG. 6, a top schematic view of an embodiment of a portion (e.g., cell element) of the electrochemical cell 32 of FIG. 3 is shown during a patterned crimping process. Further, FIG. 7 is a top schematic view of an embodiment of a portion (e.g., cell element) of the electrochemical cell 32 of FIG. 3 after the patterned crimping process. As shown in FIG. 6, the end 76 of the jelly roll 60 may be pinched and retained together (e.g., via an ultrasonic weld 77, as shown, or via a laser weld, adhesive, elastic tie, or some other pinching device or mechanism). Thus, the sheets of anode material, cathode material, and separator may be welded together (e.g., ultrasonically welded together) at the end 76 of the jelly roll. The current collector 80 disposed proximate to the end 76 of the jelly roll 60 includes the terminal 81, a first leg 90, and a second leg 92. The terminal 81 may extend (e.g., in the direction 37) from a portion (e.g., an edge or a bridge [illustrated at least in FIGS. 8, 9, 11, 13, 15, 17, and 19] connecting the first leg 90 to the second leg 92 and extending parallel to a longitudinal axis 93 of the current collector 80) of the current collector 80 between the first leg 90 and the second leg 92. The end 76 of the jelly roll 60 may be positioned between the first leg 90 and the second leg 92 of the current collector 80, such that the end 76 may be sandwiched between the first and second legs 90, 92 via a patterned crimping process, as described below.

For example, as shown, a first patterned crimping die 94 may be disposed proximate to the first leg 90 of the current collector 80, and a second patterned crimping die 96 may be disposed proximate to the second leg 92 of the current collector 80. The first and second patterned crimping dies 94, 96 may together exert a compressive force (e.g., as indicated by arrows 98) against the end 76 of the jelly roll 60 (e.g., proximate to the pinched region [ultrasonic weld 77] of the end 76 of the jelly roll 60). Each patterned crimping die 94, 96 may include a pattern disposed thereon, where the pattern leaves an impression on the corresponding leg 90, 92 of the current collector 80, and where the impression may extend into the end 76 of the jelly roll 60.

For example, as shown, the first patterned crimping die 94 and the second patterned crimping die 96 may each include a lateral face 100 (indicated by dashed lines) extending along direction 102. The first patterned crimping die 94 includes one or more ridges 104 extending opposite to direction 106 (e.g., from the lateral face 100 of the first patterned crimping die 94), and the second patterned crimping die 94 includes one or more ridges 104 extending in direction 106 (e.g., from the lateral face 100 of the second patterned crimping die 96). Although both the first and second patterned crimping dies 94, 96 include the ridges 104 extending toward the current collector 80, it should be noted that the ridges 104 of the first patterned crimping die 94 may not align with the ridges 104 of the second patterned crimping die 96 along the direction 37. For example, the ridges 104 of the first patterned crimping die 94 may be offset from the ridges 104 of the second patterned crimping die 96 along the direction 37. However, in some embodiments, the ridges 104 of the first patterned crimping die 94 may align with the ridges 104 of the second patterned crimping die 96 along the direction 37. Further, patterns other than the illustrated ridges 104 may also be possible, and will be described in detail with reference to later figures.

To crimp the current collector 80 onto the end 76 of the jelly roll 60, the first and second patterned crimping dies 94, 96 may exert the compressive force 98 inwardly against the first and second legs 90, 92 of the current collector 80, respectively. As shown in FIG. 7, the ridges 104 of the first and second patterned crimping dies 94, 96 may leave corresponding ridge impressions 108 in the first and second legs 90, 92 of the current collector 80 (and extending into the end 76 of the jelly roll 60 of the electrochemical cell 32). The ridge impressions 108 left in the current collector 80 and the end 76 of the jelly roll 60 facilitate secure coupling of the current collector 80 to the end 76 of the jelly roll 60. In some embodiments, the current collector 80 is not welded to the end 76 of the jelly roll 60 (e.g., no welding is needed). It should be noted that, in some embodiments, only one of the two patterned crimping dies 94, 96 may be used, and may sandwich the current collector 80 (and the end 76 of the jelly roll 60) between the one patterned crimping die (e.g., die 94) and a substrate (e.g., a flat surface).

Figure 8:
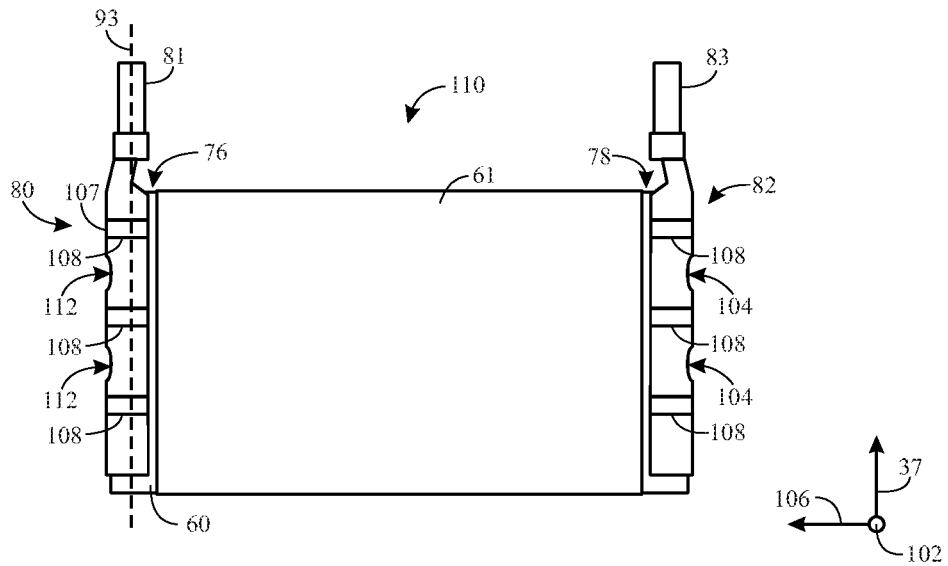
FIG. 8 is a front schematic view of an embodiment of a cell element of the electrochemical cell of FIG. 3 after a patterned crimping process, in accordance with an aspect of the present disclosure.
Figure 9:
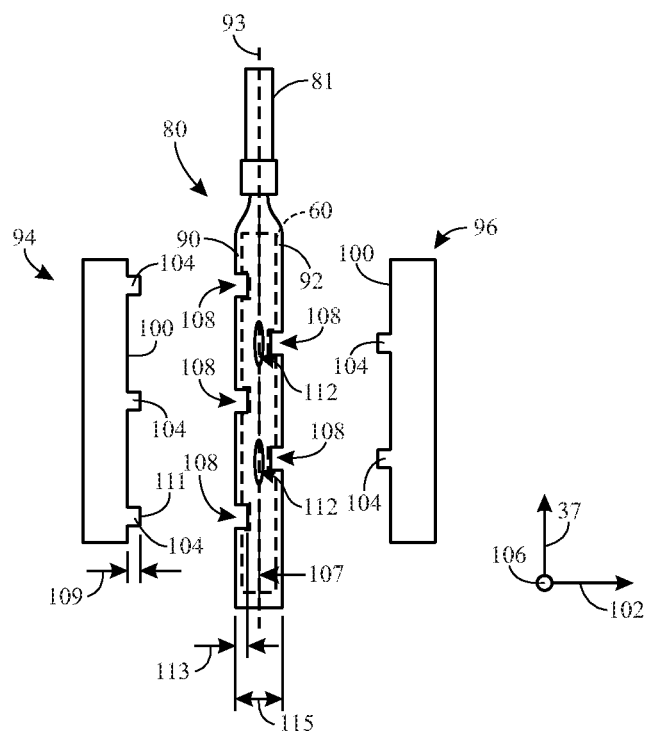
FIG. 9 is a side schematic view of an embodiment of a cell element of the electrochemical cell of FIG. 3 after a patterned crimping process, and of patterned crimping dies, in accordance with an aspect of the present disclosure.

A front schematic view of an embodiment of a cell element 110 of the electrochemical cell 32 of FIG. 3 (e.g., after the patterned crimping process) is shown in FIG. 8, and a side schematic view of an embodiment of the cell element 110 of the electrochemical cell 32 of FIG. 3 (e.g., after the patterned crimping process) is shown in FIG. 9. In the illustrated embodiments, the cell element 110 includes the jelly roll 60 and the current collectors 80, 82. As previously described, the jelly roll 60 may be disposed in the wrapper 61. The wrapper 61 may be a sheet that receives a portion of the jelly roll 60 to at least temporarily maintain the spiral shape of the jelly roll 60 until the jelly roll 60 is disposed in a full casing. The wrapper 61 may be a part of the cell element 110, or may be a separate component. Further, the wrapper 61 may not be included in all embodiments. Generally, the casing (e.g., rigid casing), which is not shown, may not be an integral part of the cell element 110. Rather, the casing receives the cell element 110 (and, in some embodiments, the electrolyte).

As shown in the illustrated embodiments, each of the current collectors 80, 82 is attached to the corresponding end 76, 78 of the jelly roll 60 via a patterned crimp. Specifically, as mentioned, the first leg 90 and the second leg 92, which are joined together by an edge 107 extending parallel to the longitudinal axis 93, are pressed to pinch the corresponding end 76, 78 between the first leg 90 and the second leg 92. For example, as shown, ridge impressions 108 crimped into the current collectors 80, 82 (and into the ends 76, 78 of the jelly roll 60) enhance coupling of the current collectors 80, 82 to the ends 76, 78, respectively. In the embodiment illustrated in FIG. 8, the ridge impressions 108 on the first current collector 80 are aligned, along the edge 107 extending in the direction 37, with the ridge impressions 108 on the second current collector 82. However, it should be noted that the ridge impressions 108 on the first current collector 80 may not align with the ridge impressions 108 on the second current collector 82 in another embodiment. Further, as shown in the embodiment in FIG. 9, the ridge impressions 108 left on the first leg 90 of the first current collector 80 are offset, along the direction 37, from the ridge impressions 108 left on the second leg 92 of the first current collector 80. Indeed, as shown, the ridges 104 of the first patterned crimping die 94 (corresponding with the ridge impressions 108 on the first leg 90 of the first current collector 80) are offset, along the direction 37, from the ridges 104 of the second patterned crimping die 96 (corresponding with the ridge impressions 108 on the second leg 92 of the first current collector 80). However, in other embodiments, the ridges 104 on the first leg 90 may not align with the ridges 104 of the second leg 92.

The pattern (e.g., the ridges 104 in the embodiment illustrated in FIG. 9) on the patterned crimping dies 94, 96 may extend (e.g., protrude) a distance 109 from the lateral surface 100 of the corresponding patterned crimping die 94 or 96. For example, as shown, the patterned crimping die 94 includes a pattern having ridges 104, where each ridge 104 includes a flat distal end 111. The flat distal end 111 in the illustrated embodiment is the furthest point on the ridge 104 from the lateral surface 100, and the distance 109 is measured from the lateral surface 100 to the farthest point (e.g., the flat distal end 111) on the pattern (e.g., ridge 104) from the lateral surface 100.

In accordance with certain embodiments, the distance 109 may be within a range of 0.5 millimeters and 1.5 millimeters (0.02 inches and 0.06 inches). In embodiments where the ridges 104 of the first dye 94 are offset from those of the second dye 96, as shown, the distance 109 may be greater than the distance 109 in embodiments where the ridges 104 of the first dye 94 are aligned with those of the second dye 96. Further, the ridge impressions 108 may each include a depth 113 within a range of 0.5 millimeters and 1.5 millimeters (0.02 inches and 0.06 inches) (e.g., generally corresponding with the distance 109 of the ridges 104), although the depth 113 of each ridge impression 108 may be slightly less than the distance 109 of the ridge 104 that leave the ridge impression 108. Further still, the current collector 80 may include a thickness 115 within a range of 1.2 millimeters and 3.6 millimeters (0.05 inches and 0.14). Accordingly, the current collector 80 may include a ratio of thickness 115 of the current collector 80 to depth 113 of the ridge impressions 108 within a range of 2 (e.g., such that the combined depths 113 of two ridge impressions 108, one on either leg 90, 92 of the current collector 80, is equal to the thickness 115 of the current collector 80) and 7.2 (e.g., the maximum thickness 115 of the current collector 80, or 3.6 millimeters, divided by the minimum depth 113 of the ridge impression 108, or 0.5 millimeters). Likewise, the system may include a ratio of the thickness 115 of the current collector 80 to the distance 109 of each of the ridges 104 of each of the dies 94, 96 within a range of 2 (e.g., such that the combined distances 109 of two ridges 104, one on either die 94, 96, is equal to the thickness 115 of the current collector 80) and 7.2 (e.g., the maximum thickness 115 of the current collector 80, or 3.6 millimeters, divided by the minimum distance 109 of the ridges 104, or 0.5 millimeters). It should be noted that, in accordance with the description of later figures below, the pattern on the patterned crimping die 94 may be different than the ridges 104 in the illustrated embodiment (and, thus, the ridge impressions 108 may be different than in the illustrated embodiment), but that the distance 109 (and the depth 113) for each embodiment is measured by the same criteria described above (e.g., from the lateral surface 100 to the farthest point of the pattern from the lateral surface 100).

As shown in both embodiments illustrated in FIGS. 8 and 9, a poka-yoke feature may be included on the current collectors 80, 82. For example, the first current collector 80 may include a different material than the second current collector 82, in accordance with electrical and welding considerations with respect to the electrochemical cell 32. Thus, it may be important to ensure that the first current collector 80 (e.g., having a first material) is affixed to the first end 76 of the jelly roll 60, and the second current collector 82 (e.g., having a second material different than the first material) is affixed to the second end 78 of the jelly roll. Thus, the first current collector 80 may be formed with a first distinguishing feature (e.g., two openings 112), and the second current collector 82 may be formed with a second distinguishing feature (e.g., one opening 114) different than the first distinguishing feature. Accordingly, during manufacturing and/or assembling (e.g., of the cell elements 110), appropriate current collectors 80, 82 will be paired with appropriate ends 76, 78 of the jelly rolls 60.

In some embodiments, pairing of the appropriate current collectors 80, 82 with the appropriate ends 76, 78 of the jelly rolls 60 may be done automatically. For example, an optical sensor may detect the two openings 112, and may automatically pair the first current collector 80 with the first end 76 of the jelly roll 60. The optical sensor may detect the one opening 114, and may automatically pair the second current collector 82 with the second end 78 of the jelly roll 60. Further still, during manufacturing and/or assembly of the current collectors 80, 82 (e.g., during attachment of the terminals 81, 83 to the current collectors 80, 82), the same (or a similar) poka-yoke process described above may be utilized to ensure that the appropriate terminals 81, 83 are paired with the appropriate current collectors 80, 82.

As previously described, patterned crimping dies in accordance with the present disclosure may include any suitable pattern configured to leave an impression on the current collectors 80, 82 and/or the ends 76, 78 of the jelly roll 60. For example, FIGS. 10, 12, 14, 16, and 18 illustrate perspective views of various embodiments of patterned crimping dies in accordance with the present disclosure. Further, FIGS. 11, 13, 15, 17, and 19 each illustrate a perspective view of an embodiment of a current collector attached to a jelly roll, where the current collector (and a portion of the jelly roll) includes impressions impressed thereon by the patterned crimping die illustrated in the immediately preceding figure.

Figure 10:
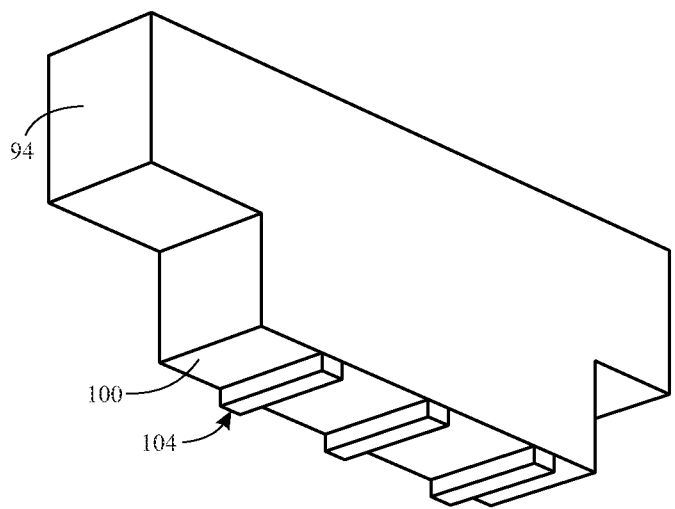
FIG. 10 is a perspective view of an embodiment of a patterned crimping die, in accordance with an aspect of the present disclosure.
Figure 11:
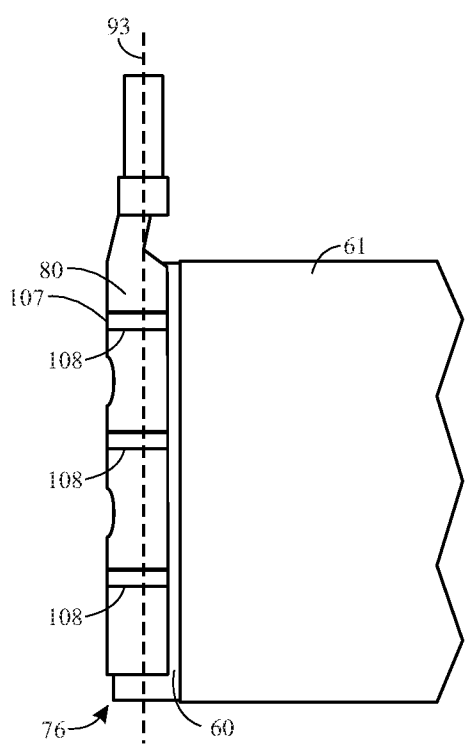
FIG. 11 is a perspective view of an embodiment of a current collector affixed to an end of a jelly roll via a patterned crimp formed by the patterned crimping die of FIG. 10, in accordance with an aspect of the present disclosure.

For example, the patterned crimping die 94 in FIG. 10 includes the ridges 104 extending from the lateral surface 100 of the patterned crimping die 94, as previously described. Any number of the ridges 104 may be included on the lateral surface 100. Further, the ridges 104 may run parallel to one another, or the ridges 104 may not run parallel to one another. As shown, the ridges 104 are flat on distal ends of the ridges. The current collector 80 having the ridge impressions 108 impressed thereon via the patterned crimping die 94 of FIG. 10 is shown in FIG. 11. As shown in FIG. 10, the ridge impressions 108 include flat floors corresponding with the flat distal ends of the ridges 104 shown in FIG. 11.

Figure 12:
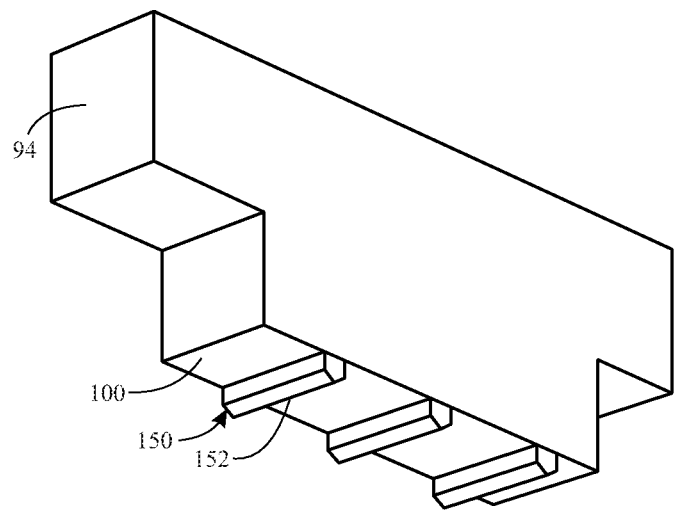
FIG. 12 is a perspective view of an embodiment of a patterned crimping die, in accordance with an aspect of the present disclosure.
Figure 13:
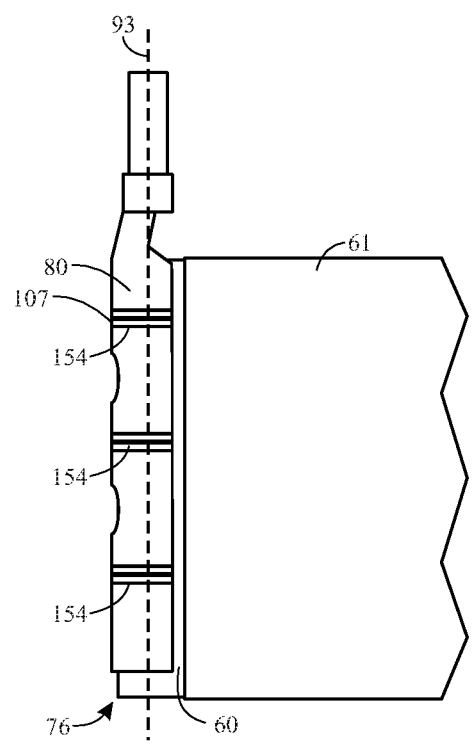
FIG. 13 is a perspective view of an embodiment of a current collector affixed to an end of a jelly roll via a patterned crimp formed by the patterned crimping die of FIG. 12, in accordance with an aspect of the present disclosure.

The patterned crimping die 94 in FIG. 12 includes pointed ridges 150 extending from the lateral surface 100 of the patterned crimping die 94, where each pointed ridge 150 includes an edge 152 at a distal end of the pointed ridge 150. Any number of the pointed ridges 150 may be included on the lateral surface 100. Further, the pointed ridges 150 may run parallel to one another, or the pointed ridges 150 may not run parallel to one another. The current collector 80 having pointed ridge impressions 154 impressed thereon via the patterned crimping die 94 of FIG. 12 is shown in FIG. 13.

Figure 14:
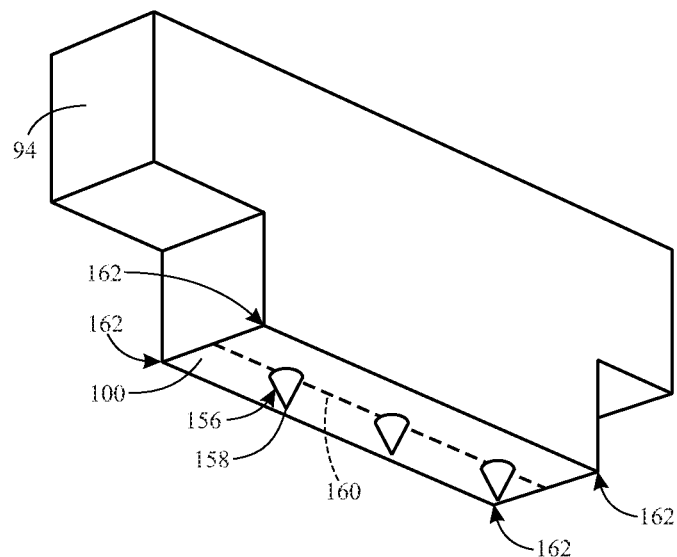
FIG. 14 is a perspective view of an embodiment of a patterned crimping die, in accordance with an aspect of the present disclosure.
Figure 15:
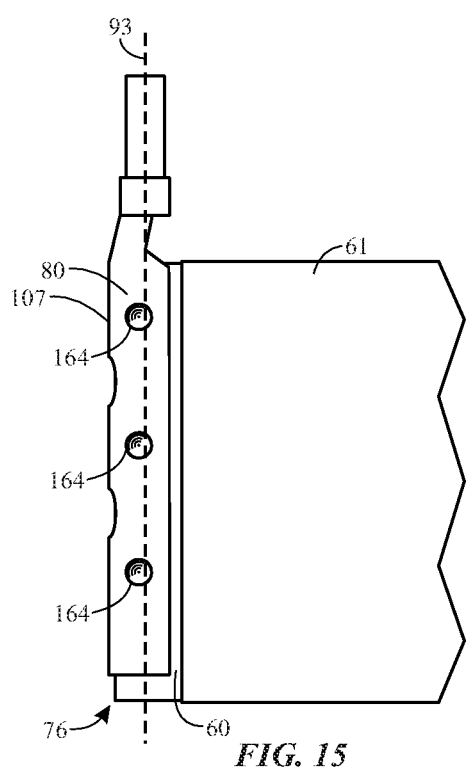
FIG. 15 is a perspective view of an embodiment of a current collector affixed to an end of a jelly roll via a patterned crimp formed by the patterned crimping die of FIG. 14, in accordance with an aspect of the present disclosure.

The patterned crimping die 94 in FIG. 14 includes cones 156 extending from the lateral surface 100 of the patterned crimping die 94, where each cone 156 includes a point 158 (e.g., tip) at a distal end of the cone 156. Any number of the cones 156 may be included on the lateral surface 100. Further, the cones 156 may be disposed in a line (as indicated by dashed line 160), or the cones 156 may not be disposed in the line 160. For example, four or more cones 156 may be included, one in each corner 162 of the die 94. The current collector 80 having cone impressions 164 impressed thereon via the patterned crimping die 94 of FIG. 14 is shown in FIG. 15.

Figure 16:
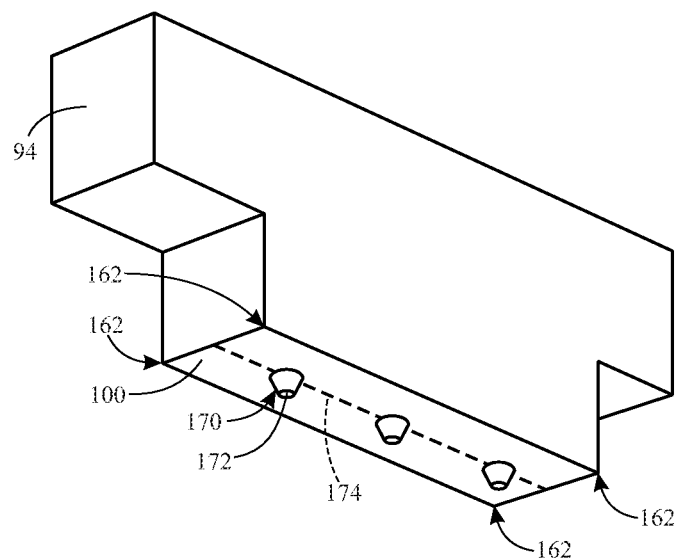
FIG. 16 is a perspective view of an embodiment of a patterned crimping die, in accordance with an aspect of the present disclosure.
Figure 17:
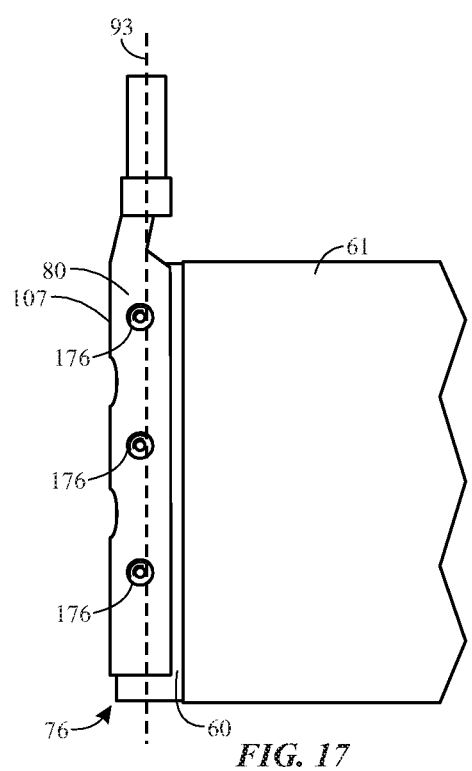
FIG. 17 is a perspective view of an embodiment of a current collector affixed to an end of a jelly roll via a patterned crimp formed by the patterned crimping die of FIG. 16, in accordance with an aspect of the present disclosure.

The patterned crimping die 94 in FIG. 16 includes frustroconical extensions 170 extending from the lateral surface 100 of the patterned crimping die 94, where each frustroconical extension 170 includes a flat surface 172 at a distal end of the frustroconical extension 170. Any number of the frustroconical extensions 170 may be included on the lateral surface 100. Further, the frustroconical extensions 170 may be disposed in a line (as indicated by dashed line 174), or the frustroconical extensions 170 may not be disposed in the line 174. For example, four or more frustroconical extensions 170 may be included, one in each corner 162 of the die 94. The current collector 80 having frustroconical impressions 176 impressed thereon via the patterned crimping die 94 of FIG. 16 is shown in FIG. 17.

Figure 18:
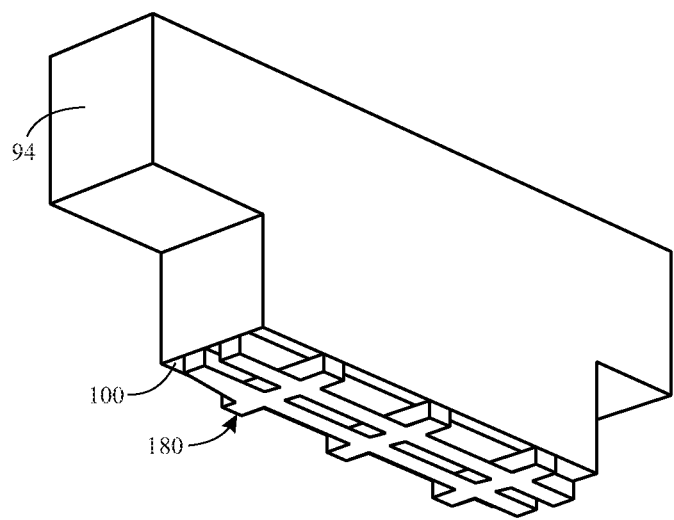
FIG. 18 is a perspective view of an embodiment of a patterned crimping die, in accordance with an aspect of the present disclosure.
Figure 19:
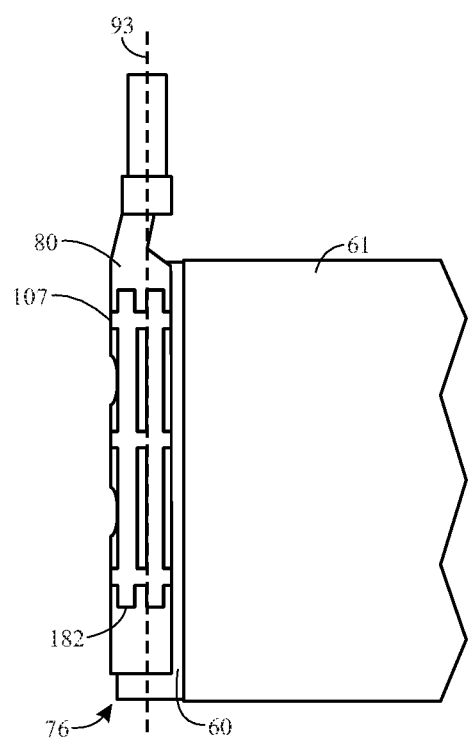
FIG. 19 is a perspective view of an embodiment of a current collector affixed to an end of a jelly roll via a patterned crimp formed by the patterned crimping die of FIG. 18, in accordance with an aspect of the present disclosure.

The patterned crimping die 94 in FIG. 18 includes a mesh extension 180 extending from the lateral surface 100 of the patterned crimping die 94. The mesh extension 180 may include a number of ridge extensions that intersect with each other. The current collector 80 having a mesh impression 182 impressed thereon via the patterned crimping die 94 of FIG. 18 is shown in FIG. 19.

Figure 20:
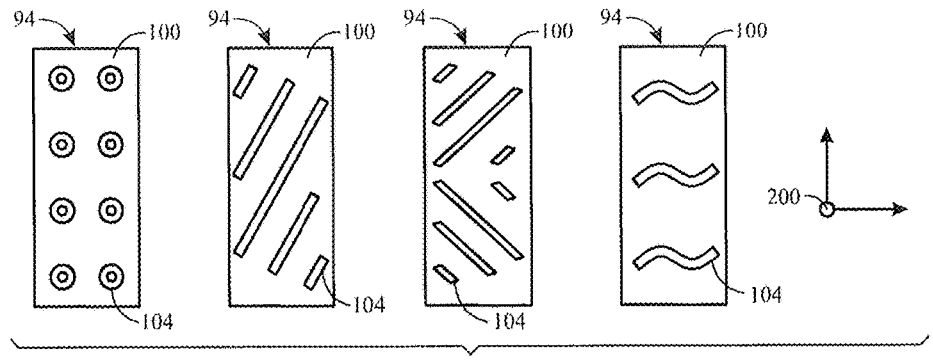
FIG. 20 is a bottom schematic view of embodiments of various patterned crimping dies, in accordance with an aspect of the present disclosure.
Figure 21:
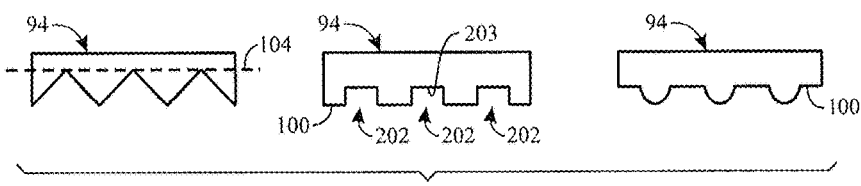
FIG. 21 is a side schematic view of embodiments of various patterned crimping dies, in accordance with an aspect of the present disclosure.

FIG. 20 illustrates a bottom schematic view of various embodiments of patterned crimping dies 94, each having a different pattern (e.g., ridges 104) extending from the lateral surface 100 (e.g., in direction 200, or generally perpendicular to a plane of the lateral surface 100) of the patterned crimping die 94. FIG. 21 illustrates a side schematic view of various embodiments of patterned crimping dies 94, each having a different pattern extending from the lateral surface 100. It should be noted that, in some embodiments, the pattern may include recessed areas 202 extending into the lateral surface 100, as opposed to extensions extending from the lateral surface. In such embodiments, the distance described with respect to FIG. 9 (e.g., distance 109) may be measured in the same manner as previously described; from the lateral surface 100 to the farthest point (e.g., a floor 203 of the recessed area 202) of the pattern from the lateral surface 100.

Figure 22:
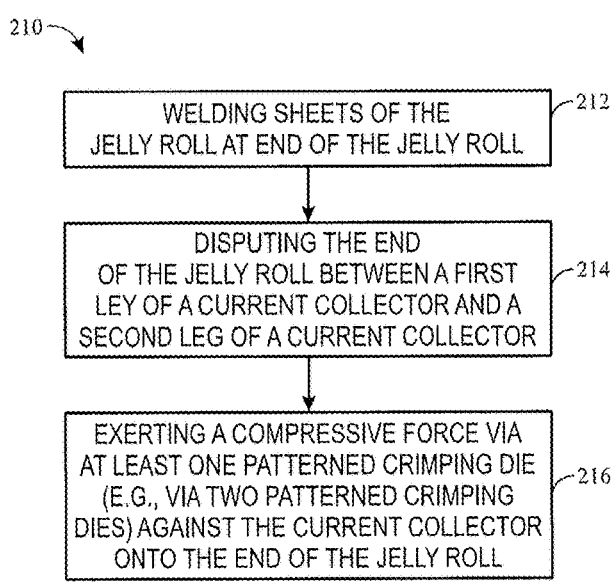
FIG. 22 is a process flow diagram illustrating an embodiment of a method of securing a current collector to an end of a jelly roll of the electrochemical cell of FIG. 4, in accordance with an aspect of the present disclosure.

Turning now to FIG. 22, a process flow diagram illustrating an embodiment of a method 210 of securing a current collector to an end of a jelly roll of an electrochemical cell is shown. In the illustrated embodiment, the method 210 includes pinching or welding (block 212) sheets of the jelly roll at the end of the jelly roll. For example, the cathode sheet, anode sheet, and separator, which may form the jelly roll, may be welded at an end of the jelly roll. Specifically, the sheets may be rolled into a cylindrical or prismatic shape having open ends of the jelly roll, where the open ends may optionally be welded (or otherwise pinched or gathered) together at the open ends (e.g., to at least partially close the ends).

The method 210 also includes disposing (block 214) the end of the jelly roll between a first leg of a current collector and a second leg of a current collector. For example, the current collector may form a U or a V shape having two legs. The end of the jelly roll may be disposed between the two legs to facilitate coupling of the current collector with the end of the jelly roll.

The method 210 also includes exerting (block 216) a compressive force via at least one patterned crimping die against the current collector to sandwich the end of the jelly roll between the two legs of the current collector. For example, two patterned crimping dies may be used, with one of the patterned crimping die proximate to the first leg of the current collector and the other of the patterned crimping die proximate to the second leg of the current collector. The two patterned crimping die may exert respective compressive forces against the legs of the current collector to sandwich the end of the jelly roll between the legs of the current collector. As previously described, the pattern of each patterned crimping die may be impressed onto the corresponding leg of the current collector. In some embodiments, the impressions may extend into and impress onto the end of the jelly roll. The impressions may generally enhance coupling of the current collector with the jelly roll. In some embodiments, the current collector may not be welded to the jelly roll. In other words, the method 210 may not include welding of the current collector to the jelly roll.

One or more of the disclosed embodiments, alone or in combination, may provide one or more technical effects useful in the manufacture of battery modules, and portions of battery modules. In general, embodiments of the present disclosure include a current collector crimped, via at least one patterned crimping die, onto an end of a jelly roll of a cell element of an electrochemical cell. The patterned crimping die(s) may include a pattern which impresses onto the current collector (and onto the end of the jelly roll) an impression of the pattern. The impression may enhance a coupling between the current collector and the end of the jelly roll. Further, the enhanced coupling between the current collector and the end of the jelly roll may obviate the need to weld the current collector to the end of the jelly roll, thereby reducing manufacturing costs and time. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
an electrochemical cell;
a jelly roll of the electrochemical cell including an anode sheet, a cathode sheet, and a separator rolled together to form the jelly roll; and
a current collector having a first leg and a second leg that are disposed around a longitudinal axis of the current collector, wherein the first leg and the second leg are joined together by an edge extending parallel to the longitudinal axis of the current collector, and wherein the current collector comprises a patterned crimp impression that extends into and fixes the current collector to an end of the jelly roll.

2. The battery module of claim 1, wherein the patterned crimp impression comprises parallel ridge impressions.

3. The battery module of claim 2, wherein the parallel ridge impressions comprise flat floors or pointed edges.

4. The battery module of claim 1, wherein the patterned crimp impression comprises conical impressions.

5. The battery module of claim 4, wherein the conical impressions comprise frustroconical impressions or pointed tips.

6. The battery module of claim 1, wherein the patterned crimp impression comprises a first impression on the first leg of the current collector and a second impression on the second leg of the current collector opposite to the first side, wherein the second impression is offset from the first impression along the longitudinal axis of the current collector.

7. The battery module of claim 1, wherein the current collector comprises a terminal fixed thereto.

8. The battery module of claim 7, wherein the terminal is welded to the current collector.

9. The battery module of claim 1, wherein the current collector is not welded to the jelly roll.

10. The battery module of claim 1, wherein the current collector comprises a poka-yoke design configured to facilitate identification of the current collector as a positive current collector or a negative current collector.

11. The battery module of claim 1, wherein the end of the jelly roll is pinched together at a weld point, and the current collector is fixed to the end of the jelly roll proximate to the weld point.

12. An electrochemical cell, comprising:
anode material, cathode material, and a separator rolled together to form a jelly roll; and
a current collector fixed to an end of the jelly roll via a patterned crimp impression on the current collector, wherein the current collector is not welded to the jelly roll.

13. The electrochemical cell of claim 12, wherein the current collector comprises a terminal attached thereto.

14. The electrochemical cell of claim 12, wherein the end of the jelly roll comprises a weld configured to define a region which receives the current collector.

15. The electrochemical cell of claim 12, wherein the patterned crimp impression comprises parallel ridge impressions, conical impressions, or mesh lines.

16. The electrochemical cell of claim 12, wherein the patterned crimp impression comprises at least one flat floor.

17. The electrochemical cell of claim 12, wherein the patterned crimp impression comprises at least one edge or at least one tip.

18. A system, comprising:
an electrochemical cell having a jelly roll and a current collector, wherein the current collector comprises a first leg disposed on a first side of an end of the jelly roll and a second leg disposed on a second side of the end of the jelly roll; and
a crimp press comprising a first die having a first crimp pattern and a second die having a second crimp pattern, wherein the crimp press is configured to press the first crimp pattern of the first die into the first leg such that the first leg is moved toward the end of the jelly roll and the second leg, and to press the second crimp pattern of the second die into the second leg such that the second leg is moved toward the end of the jelly roll and the first leg, in order to crimp the current collector onto the end of the jelly roll.

19. The system of claim 18, wherein the system does not comprise a welded connection between the current collector and the end of the jelly roll.

20. The system of claim 18, wherein the first patterned impression is offset along a longitudinal axis of the current collector from the second patterned impression.

21. The system of claim 18, wherein the first patterned impression is aligned along a longitudinal axis of the current collector with the second patterned impression.

22. The system of claim 18, wherein at least the first patterned impression comprises ridges or conical extensions extending from a lateral surface of the first die.

* * * * *

UNITED STATES PATENT AND TRADEMARK OFFICE
CERTIFICATE OF CORRECTION

PATENT NO. : 10,181,617 B2
APPLICATION NO. : 15/176954
DATED : January 15, 2019
INVENTOR(S) : Dittel et al.

Page 1 of 1

It is certified that error appears in the above-identified patent and that said Letters Patent is hereby corrected as shown below:

In the Drawings

In FIG. 22, Sheet 11 of 11, for step "214", in Line 1, please delete "DISPUTING" and insert -- DISPOSING --.

In FIG. 22, Sheet 11 of 11, for step "214", in Line 3, please delete "LEY" and insert -- LEG --.

In the Specification

In Column 2, Line 37, please delete "relates a" and insert -- relates to a --.

In Column 2, Line 63, please delete "DRAWINGS" and insert -- BRIEF DESCRIPTION OF THE DRAWINGS --.

In Column 3, Line 13, please delete "disclosure" and insert -- disclosure; --.

In Column 8, Line 57, please delete "no needed." and insert -- not needed. --.

Signed and Sealed this
Eleventh Day of June, 2019

Andrei Iancu
*Director of the United States Patent and Trademark Office*